United States Patent [19]
Maytum

[11] Patent Number: 5,883,775
[45] Date of Patent: Mar. 16, 1999

[54] OVERVOLTAGE PROTECTOR

[75] Inventor: Michael J. Maytum, Bedford, England

[73] Assignee: Power Innovative Limited, England

[21] Appl. No.: 508,861

[22] Filed: Jul. 28, 1995

[30] Foreign Application Priority Data

Jul. 29, 1994 [GB] United Kingdom ............... 941530

[51] Int. Cl.[6] ............................................. H01C 7/12
[52] U.S. Cl. ...................... 361/119; 361/56; 361/91
[58] Field of Search .................. 361/56, 119, 111, 361/91

[56] References Cited

U.S. PATENT DOCUMENTS

| 4,653,084 | 3/1987 | Ahuja | 379/59 |
| 4,695,916 | 9/1987 | Satoh et al. | 361/56 |
| 4,908,854 | 3/1990 | Löfmark et al. | 379/373 |
| 5,146,384 | 9/1992 | Markovic et al. | 361/56 |
| 5,576,919 | 11/1996 | Wilkens | 361/56 |

*Primary Examiner*—Sally C. Medley
*Attorney, Agent, or Firm*—Young & Basile, P.C.

[57] ABSTRACT

An overvoltage protection circuit passes all the normal operating voltages and limits the peak voltage increase during a lightning impulse to a level comparable to the battery voltage. Normal operating voltages of 200 V peak are passed and under lightning impulse conditions the voltage increase is limited to about 90 V. The circuit has first and second protectors connected in series, the first protector being a standard thyristor protector and the second being a gated bidirectional thyristor connected to a diode and a capacitor.

3 Claims, 3 Drawing Sheets

Fig.5.
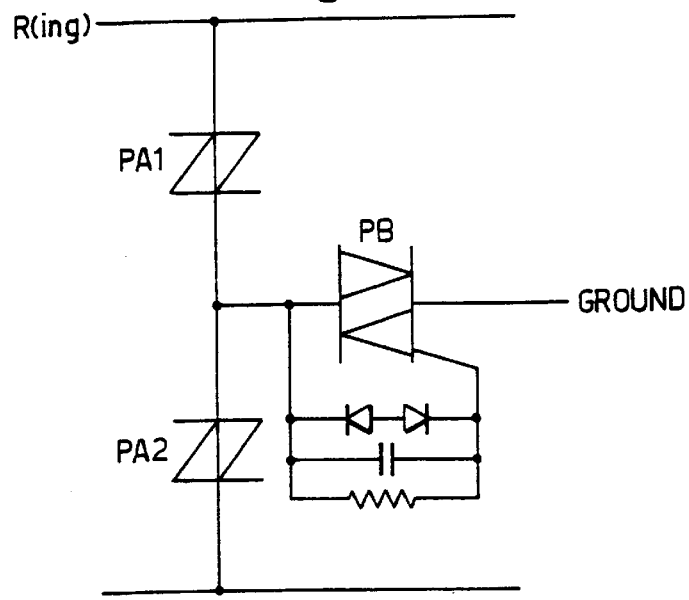
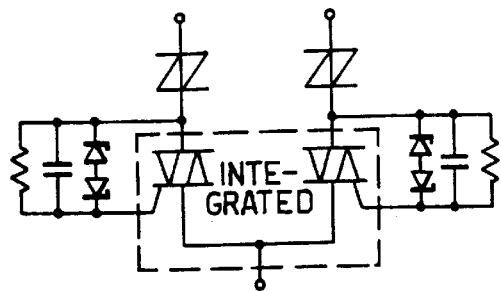
Fig. 6a.
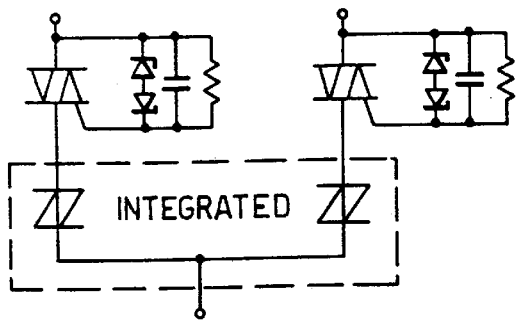
Fig. 6b.
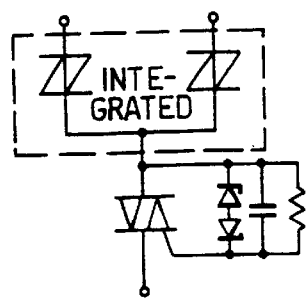
Fig. 6c.
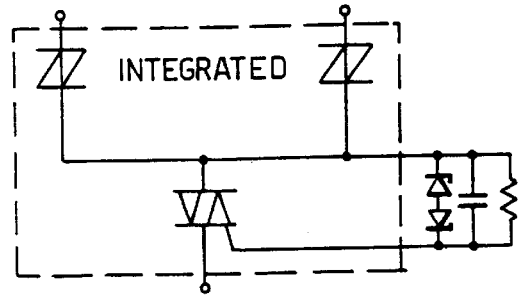
Fig. 6d.

OVERVOLTAGE PROTECTOR

FIELD OF THE INVENTION

This invention relates to overvoltage protectors, and more particularly to an overvoltage protection circuit particularly suitable for telephone lines.

BACKGROUND OF THE INVENTION

In the telephone system the principal method of connection between the exchange and the subscriber equipment is by a two wire telephone line. In the USA the two wires are called R(ing) and T(ip), while in other areas they are called A and B.

In normal operation wires R and T will be at different potentials wth respect to ground. For a given system practice there will be maximum values that these voltages can assume in normal operation. The maximum positive and negative voltages that wires R and T can reach are not necessarily the same. Also the voltage differential between the wires may not be as large as the sum of maximum positive and negative excursions of the two line wires with respect to ground.

Telephone equipment with components connected from any of the wires to ground and between the wires must have adequate voltage ratings to withstand the voltage potentials which occur in normal operation. Typically, a battery voltage of about 50 V will be applied to the line, and during ringing an additional AC voltage of 100 $V_{rms}$ (141 V peak) will be applied. Under these conditions a peak voltage of 50+142= 192 V will occur. After allowing for tolerancing, the equipment might be designed for a maximum voltage of 200 V in normal operation.

Under disturbing (abnormal) voltage conditions, caused by lightning, power line contact and induction from electrical machines, the above components must be protected against failure from these dangerous overvoltages which can occur on the line wires.

FIG. 1 shows an overvoltage protection arrangement which uses two voltage limiting devices, P1 and P2, connected from each line wire to ground. From the above example, these protectors must not limit the voltage from reaching 200 V, otherwise the normal operation of the telephone system would be impaired. The voltage limiting level of the protectors depends on the protection technology and the type of disturbing voltage that occurs. Typically, the limiting voltage of the protector passing 200 V might be 300 V under AC conditions and 350 V for fast rising/high current lightning impulse conditions.

To minimize the time for which the high voltage exists, voltage switching (crowbar) protectors are used. The characteristic and voltage limiting performance of a voltage switching protector is shown in FIG. 2. When the impulse finishes, the protector in its low voltage state will still have the wire current from the exchange battery flowing in it. It is most important that the protector switches off at this current, otherwise the line would remain shorted to ground preventing normal operation. In thyristor voltage switching protectors, this switch off current is controlled by shorting dots (see S. W. Byatt & R. A. Rodrigues: British Patent Application GB 2113 907 A, "Reverse-Breakdown PN Junction devices", published August 1983). Unfortunately, the presence of these dots slows the protector switching and this contributes to the limiting voltage increase from AC to impulse conditions (300 V to 350 V ). Typically the line DC is about 50 mA, so protectors are made with minimum switch off currents of about 150 mA.

In summary, for the example quoted, equipment designed to operate up to 200 V peak requires components rated for at least 350 V. But, as the disturbing voltage conditions are not controlled, for long service life the components may need even higher voltage ratings.

BRIEF SUMMARY OF THE INVENTION

According to one aspect of the present invention, there is provided an overvoltage protection circuit comprising a first protector operable between a first voltage and a second voltage to effect a first level of protection; a second protector in series with the first protector and being operable at a predetermined current to be rapidly conducting thereby providing further protection.

According to a second aspect of the present invention, there is provided telephone equipment including an overvoltage protection circuit according to any of the claims.

According to a third aspect of the present invention, there is provided a method of protecting equipment from overvoltage comprising the steps: providing a first protector operable between a first and second voltage to protect the equipment from overvoltage up to a predetermined level; providing a second protector for protecting the equipment beyond the predetermined overvoltage level; connecting the first and second protectors in series; and switching the protectors at different voltage and/or current levels to provide protection for a full range of overvoltages.

BRIEF DESCRIPTION OF THE DRAWINGS

FIG. 5 is an alternative embodiment according to the present invention.

FIGS. 6a to 6d show integration options for the circuits of FIGS. 3 and 5.

DETAILED DESCRIPTION OF EMBODIMENTS

The purpose of this invention is to make a protection function which passes all the normal operating voltages and limits the peak voltage increase during a lightning impulse to a level comparable to the battery voltage. Based on the example given, normal operating voltages of 200 V peak would be passed and under lightning impulse conditions the voltage increase would be limited to about 90 V.

Figure 1:
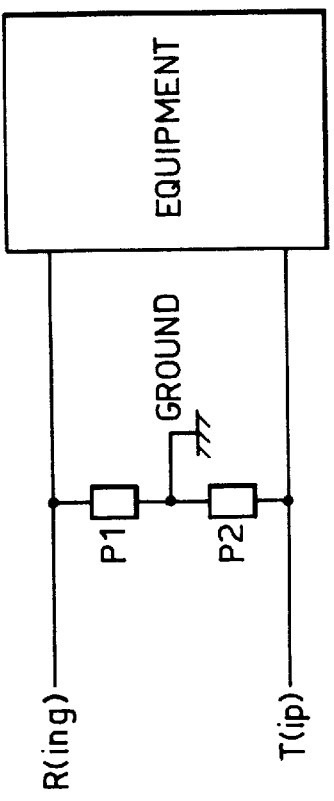
FIG. 1 is a prior art ring and tip line wire overvoltage protector.
Figure 2:
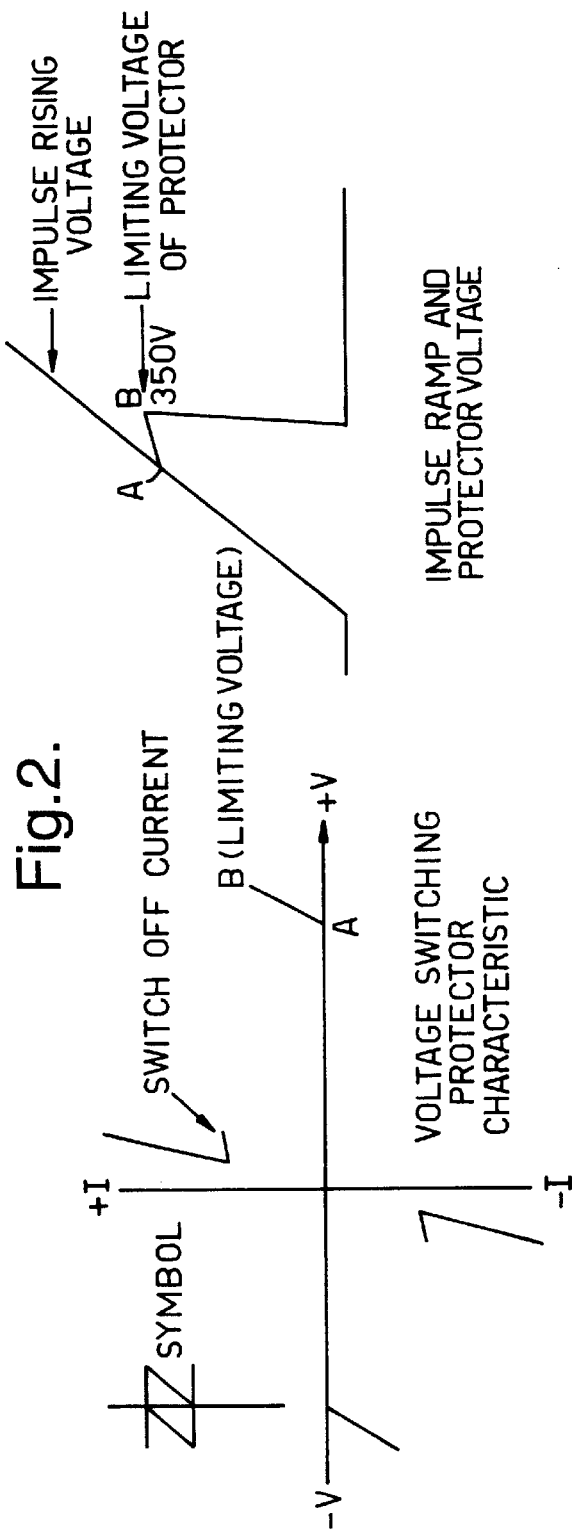
FIG. 2 is two graphs showing the voltage switching protector characteristics and the impulse ramp and protector voltages.
Figure 3:
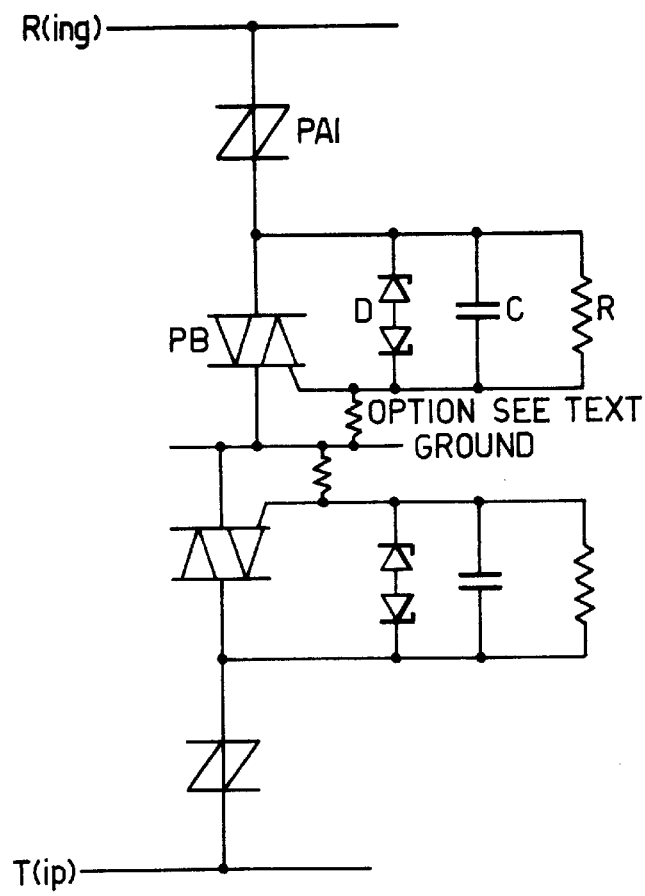
FIG. 3 is a schematic of a first embodiment of an overvoltage protector according to the invention.

FIG. 3 shows a first embodiment of the invention. Each line wire would have similar protection circuits, so only the operation of one of the two circuits will be described. Protector component integration is possible in a practical realization. Each set of line wire protectors could be integrated into a single chip or one pair of similar protectors, one from each line wire protector, could be integrated.

The circuit consists of two protectors connected in series. Protector PA is a standard thyristor protector with a working (pass) voltage of 50 V and an impulse limiting voltage of 87 V. The second protector consists of a gated bi-directional thyristor PB, with a 150 V symmetrical avalanche diode D connected between the gate and MT2. In parallel with avalanche diode D is a resistor R and a capacitor C. Capacitor C is small, such that during ringing the ringing alternating current $I_{ac}$ through the capacitor will not be large enough to trigger the thyristor PB. If, for instance, a current of 1 mA rms will not trigger the thyristor PB, then at the full ring voltage $V_{ac}$, of 100 $V_{rms}$ and a frequency f of 30 Hz, the maximum capacitor value would be:

$$C<I_{ac}/(2\pi fV_{ac})=10^{-3}/(2\pi \cdot 30 \cdot 100)=50 \text{ nF} \quad \text{(Eq. 1)}$$

Under lightning impulse conditions, when the voltage rate of rise dv/dt can exceed 100 V/microsecond, the capacitor will pass a current $I_p$ of:

$$I_p=Cdv/dt=50 \cdot 10^{-9} \cdot 100/10^{-6}=5 \text{ A} \quad \text{(Eq. 2)}$$

Figure 4:
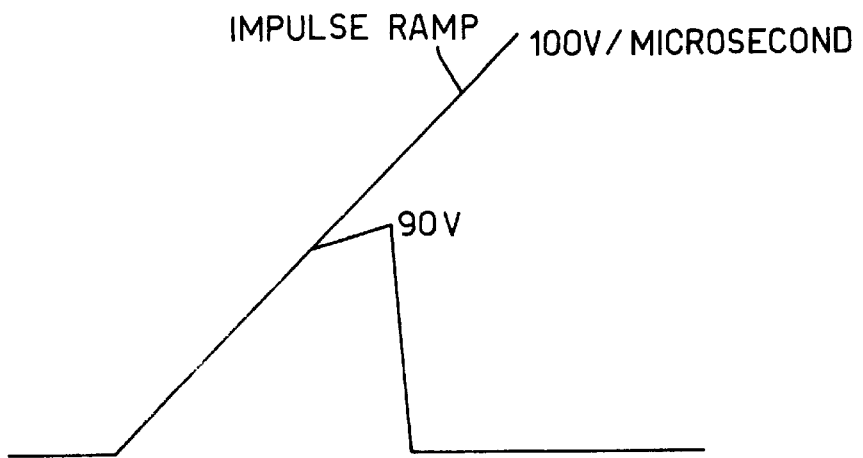
FIG. 4 is a graph showing the impulse voltage circuitry of the protector of FIG. 3.

Protector PB can be made so that this level of current will trigger it into rapid conduction. The protection sequence is shown in FIG. 4. Initially the protection circuit is inactive. Most of the 100 V/microsecond ramp is developed across protector PA, as its capacitance value is much lower than capacitor C. The limiting voltage of protector PA is 87 V, and when this is reached it switches, applying the 100 V/microsecond to protector PB, which would switch on as a result of the 5 A capacitive current calculated earlier. Due to this action, the limiting voltage is about 90 V, a major improvement from previous 350 V. In practice, it is probable that protector PB would already be on before protector PA switches as a result of the current passed by protector PA prior to switching. The switching speed of protector PB can be made very fast by making its switch-off current low, say 10 mAA.

Protector PB is in series with protector PA. The impulse causes both protectors to switch on. As the impulse current subsides, protector PA (150 mA switch off current) will switch off before protector PB (10 mA switch off current). When protector PA switches off, the wire voltage will rise to the exchange battery level and, at this voltage level, protector PA will block any current flow that would maintain protector PB in conduction. As a result, protector PB has its current reduced to zero and switches off, allowing normal operation to be restored. Thus a low high switching speed thyristor can be used for protector PB without its low value of switch off current causing permanent switch on from the line DC.

Under AC disturbing voltage conditions, the triggering current for protector PB is supplied by avalanche diode D. The limiting voltage of protector PA would be about 75 V and that of protector PB 150 V from diode D, giving a limiting voltage of 225 V. Lightning impulses and AC transients are seen as the major cause of equipment failure. So, although this invention is comparable with conventional protection under AC distrubing voltage conditions, its improved performance under impulse conditions considerably reduces impulse damage, the biggest cause of equipment failure.

Resistor R serves to discharge capacitor C, preventing charge lock up on the capacitor which would cause an offset voltage bias. Its resistance value can be high so that line leakage resistance testing could be performed, a value of 1 Mohm would give a discharge time constant of 50 ms. The 50 nF capacitor does not cause capacitive line loading problems as it is in series with the much lower capacitance of protector PA. Typically the capacitance of protector PA will be about 100 pF.

There are many variations on this approach. Avalanche diode D could be integrated with protector PB. If a higher impulse limiting voltage could be tolerated, the circuit could be reduced to FIG. 5. Here, to meet the example values, PA1 and PA2 would be of 100 V pass voltage and diode D would be 100 V to give a net pass voltage of 200 V. Under impulse condition, the limiting voltage to ground would be about 180 V, still an improvement on the 350 V of the conventional approach. Protectors PA1 and PA2 are available as a single component (packaged and as a single chip), reducing the number of component parts. It is also possible to integrate protector PB on the same chip as protectors PA1 and PA2 (FIGS. 6(a)–(d). The temperature variation of the protector PB triggering current maybe reduced by connecting an additional resistor between the gate and MT1.

This invention provides the following advantages. The overvoltage protection circuit has a substantially lower impulse limiting voltage than its normal working voltage. The circuit has reduced component count due to integration of similar protector types between line wires or disimilar protectors in a line wire to ground protection function. The circuit has fast switching though the use of a protector that would normally cause DC line lock up, but is prevented in doing so by having a conventional protector in series with a working (pass) voltage greater than or equal to the battery voltage. An overvoltage protection circuit which allows a smaller area protector as the normal shorting dot area is much reduced. This low switch off current protector that would normally cause DC line lock up, but is prevented in doing so by having a conventional protector in series with a working (pass) voltage greater than or equal to the battery voltage.

I claim:

1. An overvoltage protection circuit for providing a DC voltage limit, an AC voltage limit, a fast rising-voltage limit, and a switch-off current threshold, comprising:

first and second inputs;

a normally-open, bi-directional crowbar protector having first and second terminals, the first terminal being coupled to the first input, and having a first DC pass voltage and a switch-off current equal to the switch-off current threshold;

a normally-open gated, fast-switching bi-directional thyristor having first, second, and gate terminals, the thyristor's first and second terminals respectively coupled to the crowbar protector's second terminal and the second input, and having a switch-off current substantially less than the switch-off current threshold; and a shunt circuit coupled between the thyristor's first and gate terminals and having a second DC pass voltage equal to the DC voltage limit minus the first DC pass voltage, and for triggering the thyristor closed when the voltage between the first and second inputs either (i) exceeds the AC voltage limit, or (ii) exceed the fast rising-voltage limit, wherein the shunt circuit comprises a symmetrical avalanche diode in parallel with a capacitive shunt.

2. An overvoltage protection circuit for providing a DC voltage limit, an AC voltage limit, a fast rising-voltage limit, and a switch-off current threshold, comprising:

first and second inputs;

a normally-open, bi-directional crowbar protector having first and second terminals, the first terminal being coupled to the first input, and having a first DC pass voltage and a switch-off current equal to the switch-off current threshold;

a normally-open gated, fast-switching bi-directional thyristor having first, second, and gate terminals, the thyristor's first and second terminals respectively coupled to the crowbar protector's second terminal and the second input, and having a switch-off current substantially less than the switch-off current threshold; and a shunt circuit coupled between the thyristor's first and gate terminals and having a second DC pass voltage equal to the DC voltage limit minus the first DC pass voltage, and for triggering the thyristor closed when the voltage between the first and second inputs either (i) exceeds the AC voltage limit, or (ii) exceed the fast rising-voltage limit, wherein the shunt circuit comprises:

a capacitive shunt coupled between the thyristor's first and gate terminals for triggering the thyristor closed when the voltage between the first and second inputs exceeds the fast-rising voltage limit.

3. An overvoltage protection circuit for providing a DC voltage limit, an AC voltage limit, a fast rising-voltage limit, and a switch-off current threshold, comprising:

first and second inputs;

a normally-open, bi-directional crowbar protector having first and second terminals, the first terminal being coupled to the first input, and having a first DC pass voltage and a switch-off current equal to the switch-off current threshold;

a normally-open, bi-directional crowbar protector having first and second terminals, the first terminal being coupled to the first input, and having a first DC pass voltage and a switch-off current equal to the switch-off current threshold;

a normally-open gated, fast-switching bi-directional thyristor having first, second, and gate terminals, the thyristor's first and second terminals respectively coupled to the crowbar protector's second current substantially less than the switch-off current threshold; and a shunt circuit coupled between the thyristor's first and gate terminals and having a second DC pass voltage equal to the DC voltage limit minus the first DC pass voltage, and for triggering the thyristor closed when the voltage between the first and second inputs either (i) exceeds the AC voltage limit, or (ii) exceed the fast rising-voltage limit, wherein the shunt circuit comprises:

a capacitive shunt coupled between the thyristor's first and gate terminals for triggering the thyristor closed when the voltage between the first and second inputs exceeds the fast-rising voltage limit; and a symmetrical avalanche diode coupled between the thyristor's first and gate terminals and having the second DC pass voltage, for triggering the thyristor closed when the voltage between the first and second inputs exceeds the AC voltage limit.

* * * * *

UNITED STATES PATENT AND TRADEMARK OFFICE
CERTIFICATE OF CORRECTION

PATENT NO. : 5,883,775
DATED : March 16, 1999
INVENTOR(S) : Michael J. Maytum

It is certified that error appears in the above-identified patent and that said Letters Patent is hereby corrected as shown below:

Item [73],

Title page, on Assignee line delete "POWER INNOVATIVE LIMITED" and insert --POWER INNOVATIONS LIMITED--.

Title page, under Foreign Application Priority Data title delete "941530" and insert --9415350--.

On column 3, line 31 delete "10mAA" and insert --10mA--.

On column 5, lines 26 through column 6, lines 2 delete "a normally-open, bi-directional crowbar protector having first and second terminals, the first terminal being coupled to the first input, and having a first DC pass voltage and a switch-off current equal to the switch-off current threshold;".

On column 6, line 6 after "second" insert --terminal and the second input, and having a switch-off--.

Signed and Sealed this

Thirtieth Day of November, 1999

Attest:

Q. TODD DICKINSON

Attesting Officer

Acting Commissioner of Patents and Trademarks